United States Patent
Shi et al.

(10) Patent No.: US 10,084,263 B1
(45) Date of Patent: Sep. 25, 2018

(54) CABLE CONNECTOR

(71) Applicant: ANYTEK Technology Corporation Ltd., New Taipei (TW)

(72) Inventors: Jun Shi, Shenzhen (CN); Hao Chen, Shenzhen (CN)

(*) Notice: Subject to any disclaimer, the term of this patent is extended or adjusted under 35 U.S.C. 154(b) by 0 days.

(21) Appl. No.: 15/813,167

(22) Filed: Nov. 15, 2017

(30) Foreign Application Priority Data

Sep. 20, 2016 (CN) .............. ZL2016 2 1065249 U

(51) Int. Cl.
| | |
|---|---|
| *H01R 29/00* | (2006.01) |
| *H01R 13/641* | (2006.01) |
| *G02B 6/38* | (2006.01) |
| *G02B 6/42* | (2006.01) |
| *H01R 13/46* | (2006.01) |
| *H01R 24/46* | (2011.01) |
| *H01R 103/00* | (2006.01) |
| *H01R 4/48* | (2006.01) |
| *H01R 13/70* | (2006.01) |

(52) U.S. Cl.
CPC .......... *H01R 13/641* (2013.01); *G02B 6/389* (2013.01); *G02B 6/4296* (2013.01); *H01R 13/465* (2013.01); *H01R 24/46* (2013.01); *G02B 6/3821* (2013.01); *H01R 4/4845* (2013.01); *H01R 13/701* (2013.01); *H01R 2103/00* (2013.01)

(58) Field of Classification Search
USPC ....................................................... 439/188
See application file for complete search history.

(56) References Cited

U.S. PATENT DOCUMENTS 8,113,858 B1 * 2/2012 Chiang ................ H01R 13/701
439/188

* cited by examiner

*Primary Examiner* — Tho D Ta

(57) ABSTRACT

A cable connector comprises a housing, a conductive element fixed on the housing and connected with the cable, an elastic piece adjacent to the conductive element, detective and switch terminals fixed on the housing and connected with a pressing plate. The pressing plate is rotatable between a first position and a second position. When the pressing body is abutted at the first position by the elastic piece, a receiving gap between the elastic piece and the conductive element is closed to prevent the cable from entering, and the pressing body is abutted against the switch terminal to define a first conductive state. When the pressing body is at the second position, the receiving gap is opened to receive the cable, and the pressing body is disengaged with the switch terminal, to define a second conductive state. A connection state can be known by detecting the first and second conductive states.

10 Claims, 7 Drawing Sheets

CABLE CONNECTOR

BACKGROUND OF THE INVENTION

1. Field of the Invention

The present invention relates generally to a cable connector and in particular to a cable connector having function of detection.

2. Related Art

Electric connectors are the main components for electrical connection between electronic products. Cable connectors are commonly used for connection between cables and electronic products. Because of some advantages, such as having more steady and reliable connections, simpler assembling process and easier cable replacement, the cable connectors have been widely used in applications. However, for conventional cable connectors, the connection state between cables and connectors still needs to be inspected or detected artificially, so it may not be easy to find out accidentally disconnected cables in time, leading to delays in repair for function recovery.

SUMMARY OF THE INVENTION

An object of the present invention is to provide a cable connector. The cable connector of the present invention has a function of detection. Compared with a conventional cable connector, the cable connector with detection function in accordance with the present invention provides a timely detection on an electrical connection state between a cable and the cable connector.

To achieve the object, the cable connector comprises a housing, an opening, a conductive element, a pressing body, an elastic piece, and two terminals. The opening is formed with the housing to receive a cable. The conductive element is fixed on the housing. The pressing body is connected with the housing, and the pressing body is rotated between a first position and a second position. The elastic piece is fixed on the housing, and the elastic piece is abutted against the pressing body at the first position. The two terminals are fixed on the housing, and the two terminals include a first terminal and a second terminal adjacent to the first terminal. When the pressing body is at the first position, a receiving gap between the elastic piece and the conductive element is closed to prevent the cable from entering the receiving gap, and the pressing body is abutted against the first terminal, to define an electrical connection state between the first terminal and the second terminal as a first conductive state. When the pressing body is at the second position, the receiving gap between the elastic piece, the conductive element is opened to receive the cable which is then electrically connected with the conductive element, and the pressing body is disengaged with the first terminal, to define an electrical connection state between the first terminal and the second terminal as a second conductive state.

In accordance with an embodiment of the present invention, the pressing body is formed with a flange, and the flange is abutted against the first terminal.

In accordance with an embodiment of the present invention, the conductive element includes a top and a bottom, the top of the conductive element is located in the housing, and the bottom of the conductive element is extended out of the housing.

In accordance with an embodiment of the present invention, a top of the elastic piece is formed with an elastic cantilever, the pressing body is formed with a groove, and the elastic cantilever is inserted in the groove to enable the elastic piece to be abutted against the pressing body.

In accordance with an embodiment of the present invention, the top of the elastic piece is formed with a cutting edge.

In accordance with an embodiment of the present invention, a top of the conductive element is formed with a cantilever, and a receiving gap is formed between the cutting edge of the elastic piece and the cantilever of the conductive element.

In accordance with an embodiment of the present invention, the housing has a pivot, and the pressing body is arranged on the pivot and rotatably connected with the housing.

In accordance with an embodiment of the present invention, the first terminal has a contact part, and an electrical connection is formed when the contact part of the first terminal is connected with the second terminal.

In accordance with an embodiment of the present invention, the housing has a raised column, and the conductive element is arranged on the raised column and fixed on the housing.

In accordance with an embodiment of the present invention, the cable connector further comprises a cover plate, wherein the cover plate covers a side opening of the housing.

DESCRIPTION OF THE INVENTION

Figure 1:
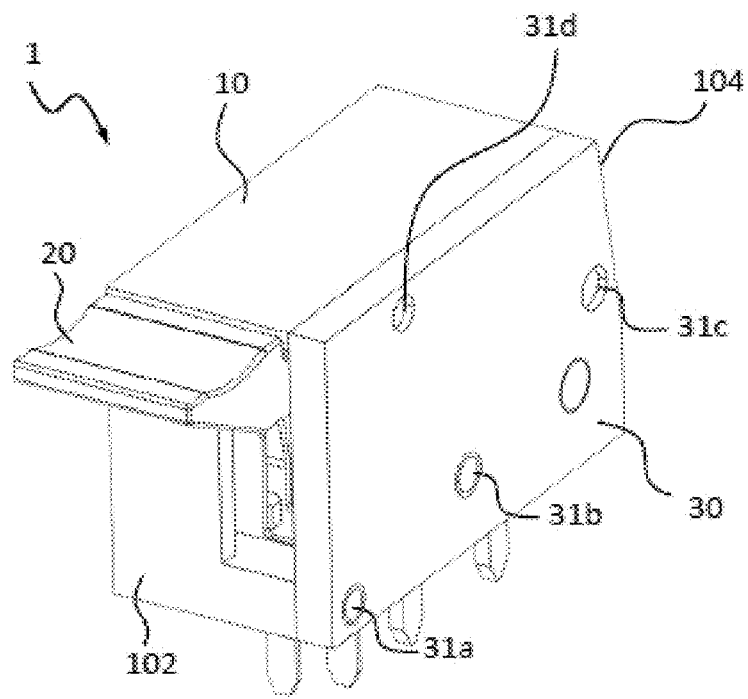
FIG. 1 is a perspective view of the cable connector in accordance with the present invention.
Figure 2:
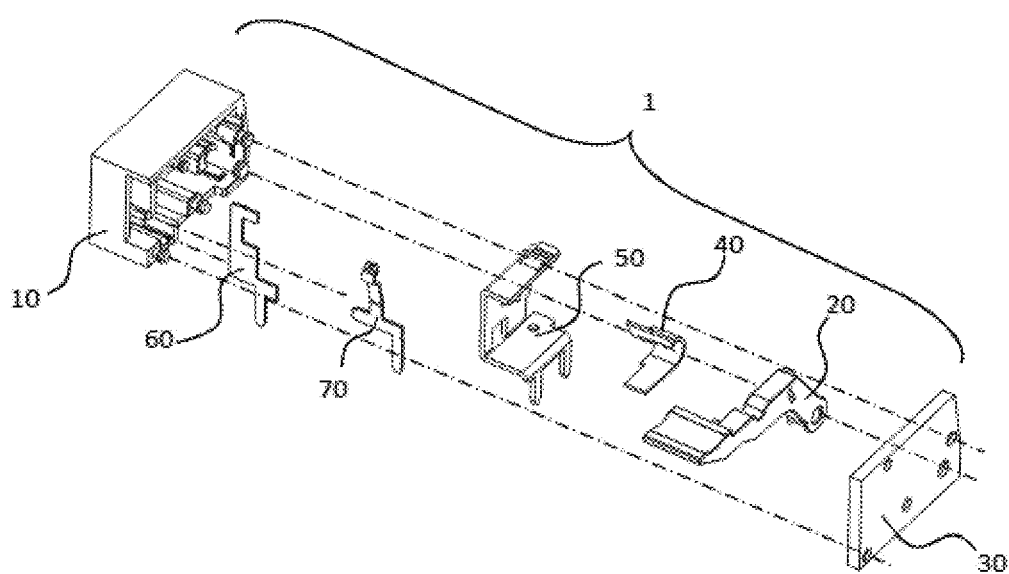
FIG. 2 is an exploded perspective view showing the cable connector of FIG. 1.
Figure 3:
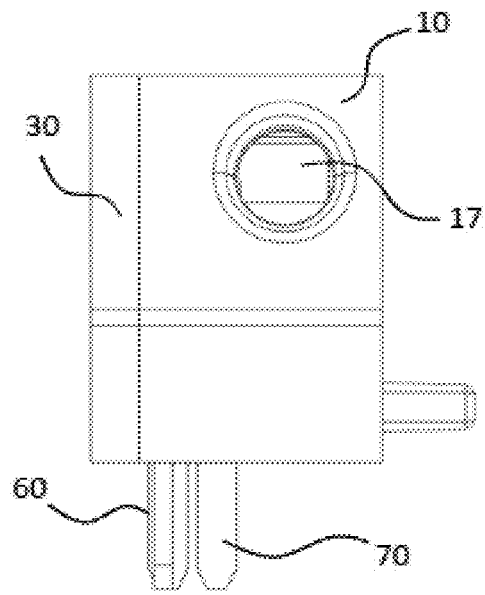
FIG. 3 is a rear view of the cable connector of FIG. 1.
Figure 4:
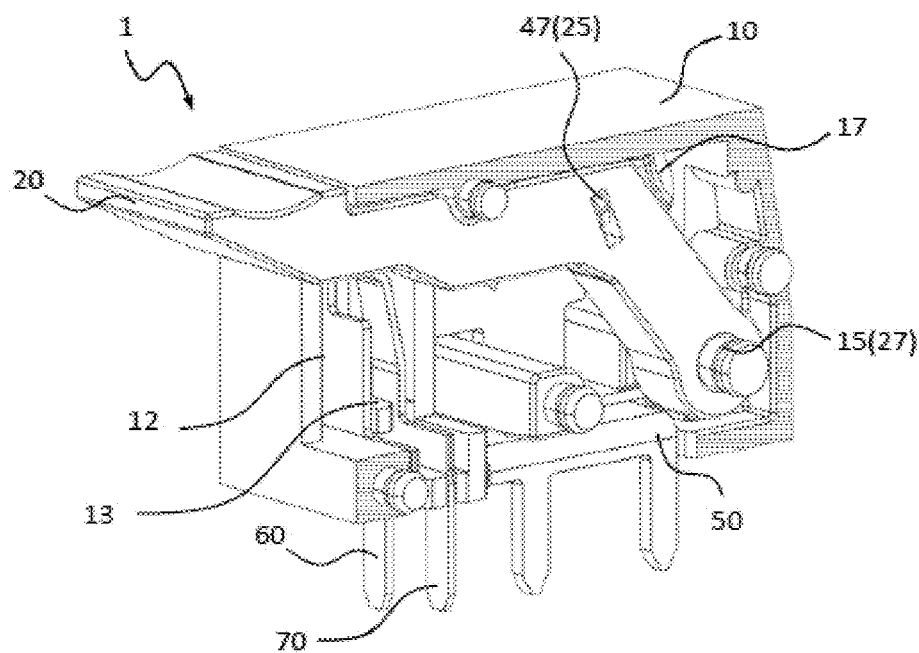
FIG. 4 is a perspective view showing the cable connector of FIG. 1, exclusive of the cover plate.
Figure 5:
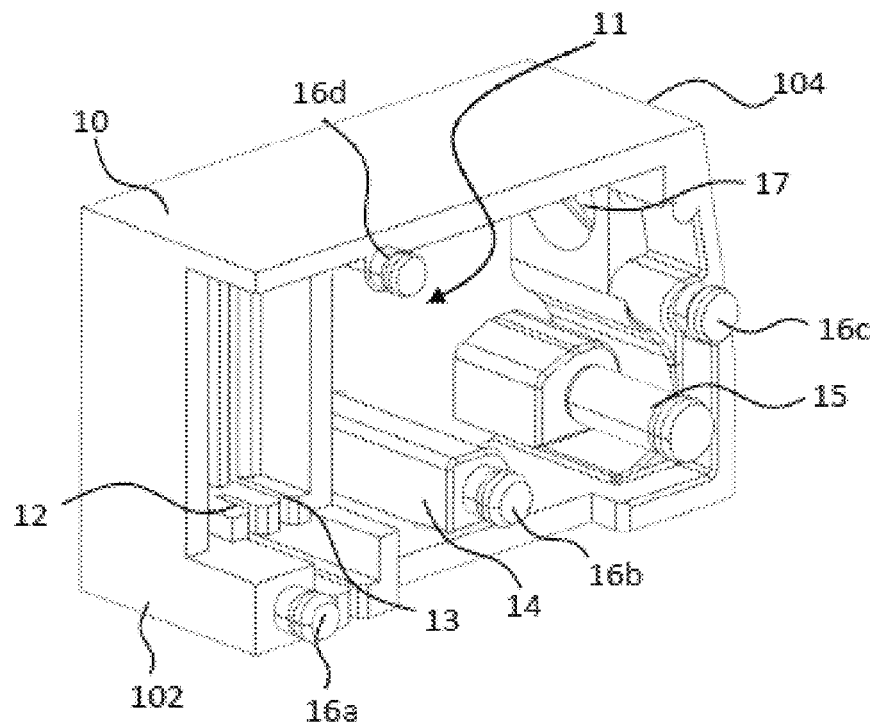
FIG. 5 is a perspective view showing a housing of the cable connector of FIG. 1.
Figure 6:
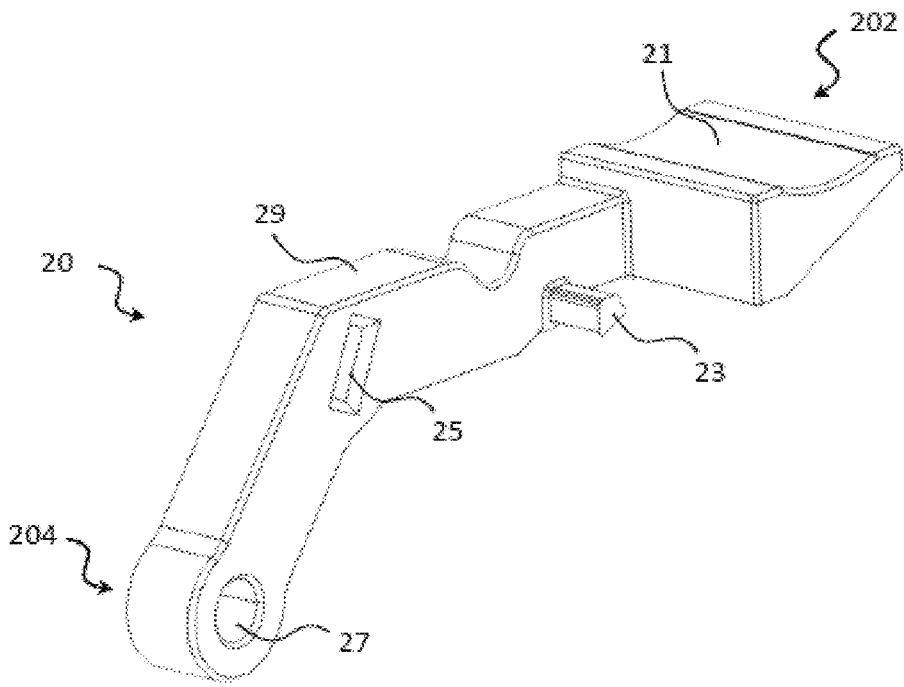
FIG. 6 is a perspective view showing a pressing body of the cable connector of FIG. 1.
Figure 7:
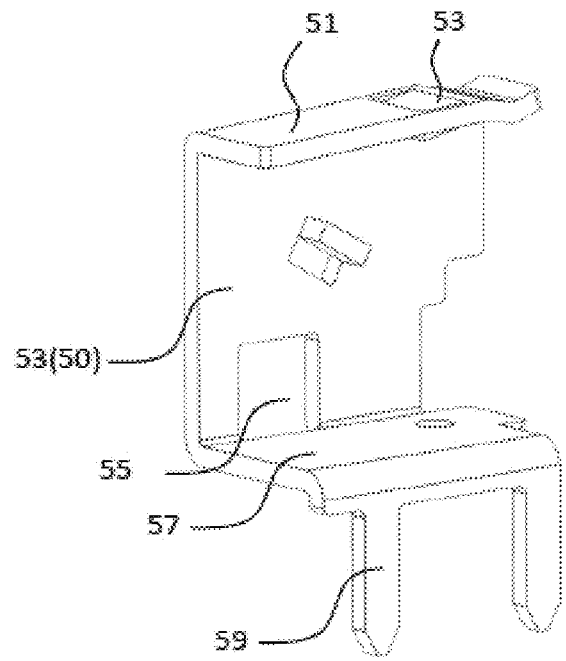
FIG. 7 is a perspective view showing a conductive element of the cable connector of FIG. 1.
Figure 8:
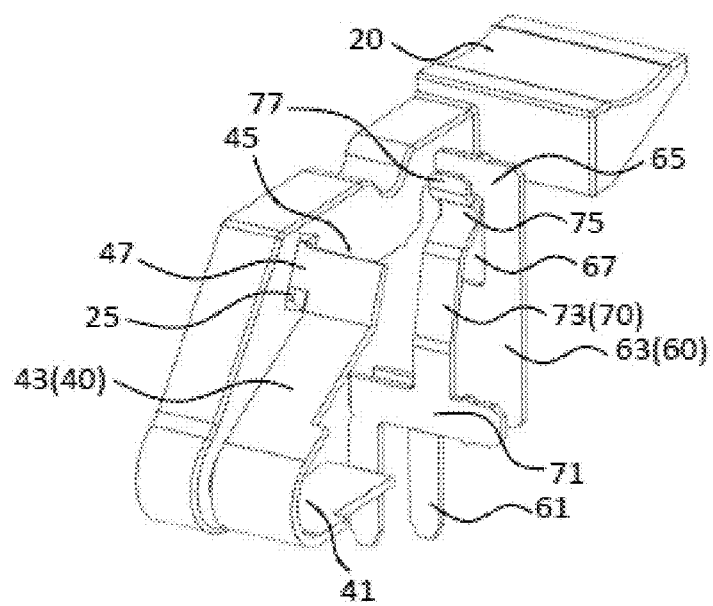
FIG. 8 is a perspective view showing partial components of the cable connector of FIG. 1.

Referring to FIGS. 1 to 5, which shows a preferred embodiment in accordance with the present invention, a cable connector 1 comprises: a housing 10, a pressing body 20 connected with the housing 10, a conductive element 50 fixed on the housing 10, and an elastic piece 40 fixed on the housing 10 and abutted against the pressing body 20. The housing 10 has a first slot 12 adjacent to a forepart 102, a detective terminal 60 fixed on the first slot 12, a second slot 13 adjacent to the forepart 102, a switch terminal 70 fixed on the second slot 13. The housing 10 further has a side opening 11 and a cover plate 30 covering the side opening 11. A rear end 104 of the housing 10 has a rear opening 17, used for receiving a cable.

With reference to FIGS. 5 to 8, the side opening 11 of the housing 10 is provided as an assembled opening. A middle of the housing 10 has a raised column 14. The conductive element 50 is arranged on the raised column 14 and fixed on the housing 10. A rear position of the housing 10 has a pivot 15. The pressing body 20 is arranged on the pivot 15 and rotatably connected with the housing 10. An inner edge of the side opening 11 is arranged with bumps 16a, 16b, 16c, that are inserted in holes 31a, 31b, 31c, 31d of the cover plate 30, so as to ensure that the cover plate 30 is fixed on the housing 10 and the side opening 11 is entirely closed.

The pressing body 20 includes a front part 202, a rear part 204, and a body portion 29 between the front part 202 and the rear part 204. The front part 202 is formed with a hand lever 21. The body portion 29 is formed with a flange 23 which is extended laterally and abutted against the switch terminal 70. The body portion 29 is further formed with a groove 25, and the rear part 204 is formed with a pivoting hole 27. The pivoting hole 27 is connected with the pivot 15 of the housing 10. The pressing body 20 rotates between a first position and a second position relative to the housing 10, with the pivot 15 as a center.

The conductive element 50 includes a top 51, a positioning hole 55 formed in periphery of the conductive element 50, and an end 59 formed at a bottom 57 of the conductive element 50 and extended downwardly. The positioning hole 55 of the conductive element 50 is sheathed on the raised column 14 of the housing 10 so that the conductive element 50 is fixed on the housing 10. The top 51 of the conductive element 50 is located inside the housing 10. The bottom 57 of the conductive element 50 is extended out of the housing 10 to be connected with an external circuit board. The conductive element 50 further includes a cantilever 53, disposed at an inner side of the top 51 of the conductive element 50. The cantilever 53 is tilted downwardly to coordinate with the elastic piece 40 to form a receiving gap for receiving the cable.

The elastic piece 40 includes a body part 43, a bottom part 41 at bottom of the body part 43, a cutting edge 45 at top of the body part 43. The bottom part 41 of the elastic piece 40 is flat. The body part 43 is elastically deformable and is formed with the bottom part 41. The cutting edge 45 has a thickness slightly smaller than that of the body part 43, and coordinates with the cantilever 53 of the conductive element 50 to form the receiving gap for receiving the cable. The cutting edge 45 is formed with an elastic cantilever 47 which is extended laterally and inserted in the groove 25 of the pressing body 20 so that the elastic piece 40 is abutted against the pressing body 20 to be held at the first position.

The detective terminal 60 includes a tail end 61 formed at a bottom of the detective terminal 60, a main body 63 formed in the first slot 12 of the housing 10, a contact end 65 formed at a top of the detective terminal 60, and a mouth 67 formed between the contact end 65 and the main body 63. The switch terminal 70 includes a distal end 71 at a bottom of the switch terminal 70, an elastic arm 73 formed at the distal end 71, a contact part 77 at a top of the elastic arm 73, and a abutting surface 75 formed between the elastic arm 73 and the contact part 77. The abutting surface 75 is located at the mouth 67 of the detective terminal 60 and is abutted against the flange 23 of the pressing body 20.

Figure 9:
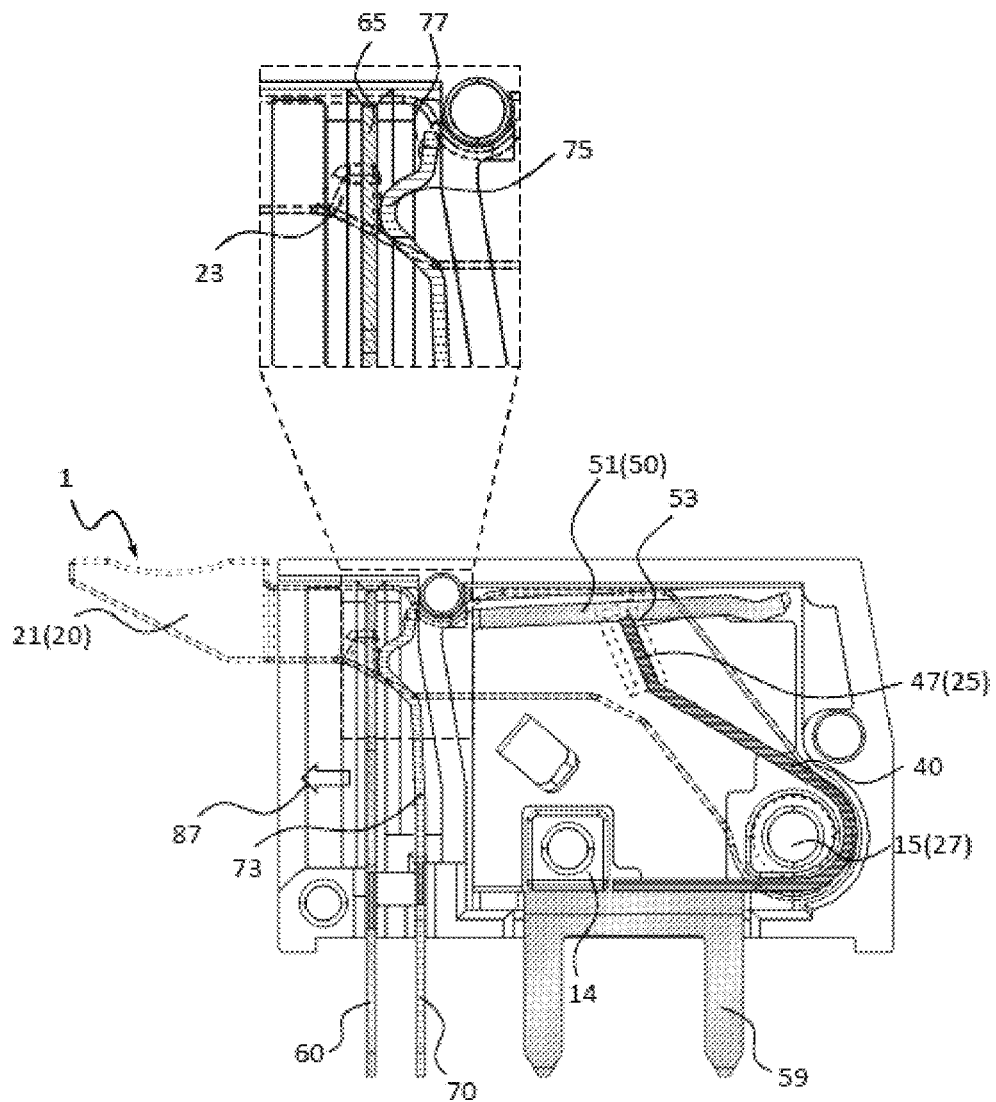
FIG. 9 is a longitudinal sectional view of FIG. 3 showing the structural situation of the cable connector before the cable is connected with the cable connector.

An example of the pressing body 20 of the cable connector 1 located at the first position is shown in FIG. 9. At the first position, the elastic piece 40 contacts with the conductive element 50, and the receiving gap therebetween is entirely closed or becomes smaller than a sectional dimension of the cable, to prevent an end of the cable from entering the receiving gap. The pressing body 20 is held at the first position by the elastic piece 40, by means of the elastic cantilever 47 of the elastic piece 40 abutting the groove 25 of the pressing body 20. Meanwhile, the flange 23 of the pressing body 20 is abutted against the abutting surface 75 of the switch terminal 70 to cause an elastic deformation of the elastic arm 73 of the switch terminal 70, which allows the elastic arm 73 of the switch terminal 70 to move away from the detective terminal 60 to disconnect the contact part 77 of the switch terminal 70 and the contact end 65 of the detective terminal 60, so as to provide a disconnection between the switch terminal 70 and the detective terminal 60. When the pressing body 20 is at the first position, the disconnection between the switch terminal 70 and the detective terminal 60 is defined as a first conductive state, which is detectable by means of terminal detection, representing that the cable connector 1 is not electrically connected with the cable.

Figure 10:
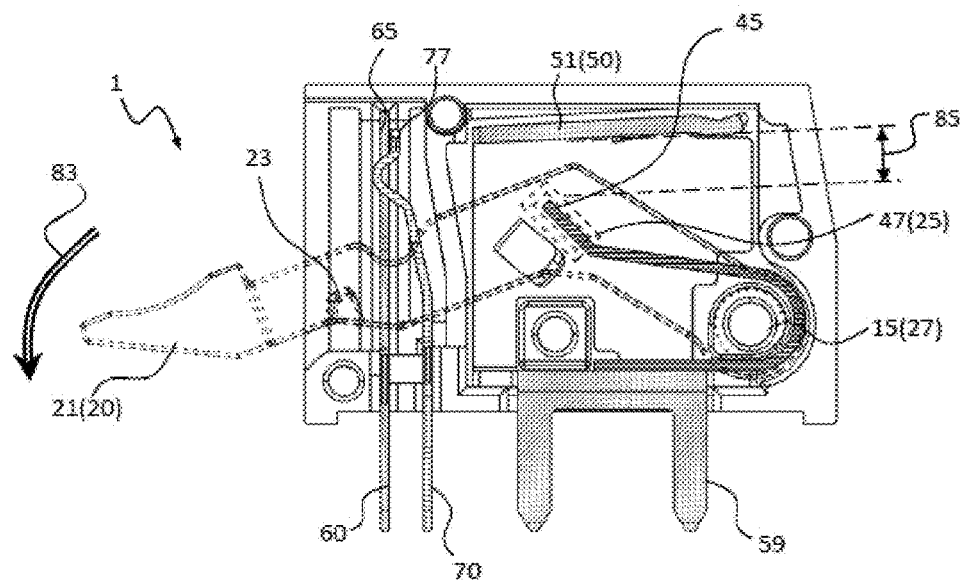
FIG. 10 is a longitudinal sectional view of FIG. 3 showing the structural situation of the cable connector when the cable is received in the cable connector.
Figure 11:
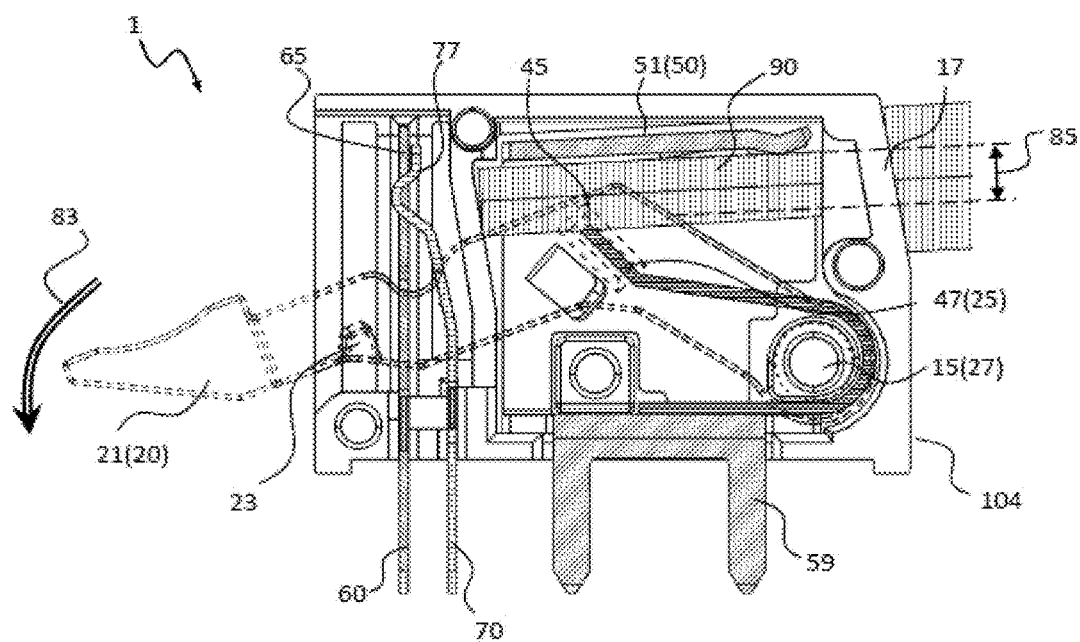
FIG. 11 is a longitudinal sectional view of FIG. 3 showing the structural situation of the cable connector after the cable is connected with the cable connector.

With reference to FIGS. 10 and 11, when the cable connector 1 is connected with the cable, the pressing body 20 rotates along a rotational direction 83 to overcome a force that the elastic piece 40 acts on the pressing body 20. The elastic piece 40 rotates along with the pressing body 20 and produces a considerable elastic deformation to open the receiving gap 85 between the cutting edge 45 of the elastic piece 40 and the top 51 of the conductive element 50, wherein the receiving gap 85 is larger than the sectional dimension of the cable, allowing the end of the cable 90 to be inserted in the receiving gap 85. Meanwhile, the pressing body 20 is disengaged with the switch terminal 70 by rotating along the rotational direction 83 to release a pressure that the pressing body 20 acts on the abutting surface 75 of the switch terminal 70, allowing the elastic arm 73 of the switch terminal 70 to recover the elastic deformation, that is, the elastic arm 73 of the switch terminal 70 rebounds along with a direction 87 toward the detective terminal 60, so that the contact part 77 of the switch terminal 70 is abutted against the contact end 65 of the detective terminal 60. An electrical connection therebetween is provided. An end of the cable 90 is inserted in the receiving gap 85 of the cable connector 1 from the rear opening 17 of the rear end 104 of the housing 10. The elastic piece 40 then clamps an end of the cable 90 at between the cutting edge 45 and the cantilever 53 by a rebounding force, whereby the cable 90 is connected with the cable connector 1. After the cable 90 is clamped in the receiving gap 85, the elastic piece 40 rebounds and the pressing body 20 is held at the second position. Thus, the flange 23 of the pressing body 20 is disengaged from the abutting surface 75 of the switch terminal 70, while the contact part 77 is abutted against the contact end 65, representing an electrical connection. The electrical connection between the switch terminal 70 and the detective terminal 60 is defined as a second conductive state which is detectable by means of terminal detection. The second conductive state provides a detecting signal with respect to the cable connector 1 in which the cable 90 is inserted.

In accordance with the embodiment of the present invention, if the electrical connection state between the switch terminal 70 and the detective terminal 60 is detected as an electrical disconnection state such as the first conductive state, it is concluded that there is no electrical connection between the cable and the cable connector 1. If the electrical connection state between the switch terminal 70 and the detective terminal 60 is detected as an electrical connection state such as the second conductive state, it is concluded that there is an electrical connection between the cable and the cable connector 1.

Figure 12:
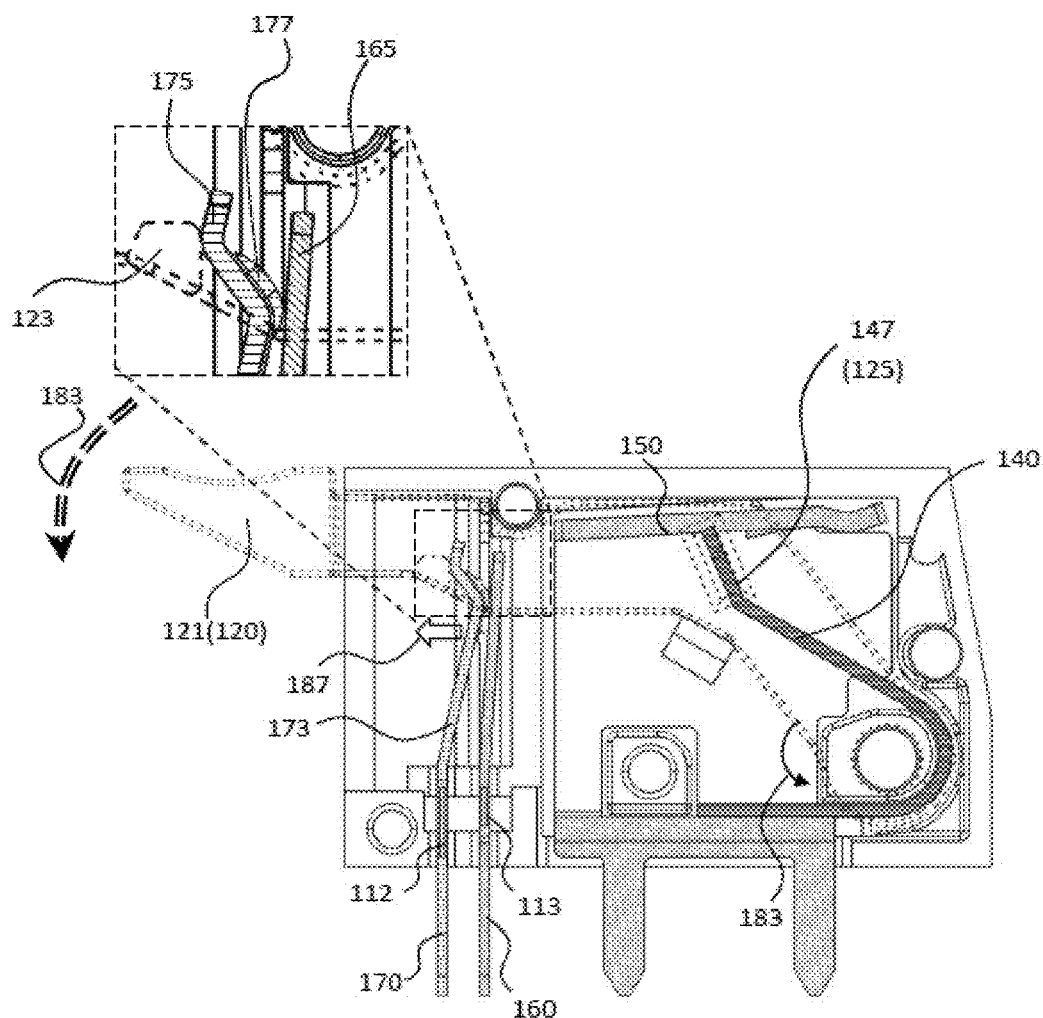
FIG. 12 is another longitudinal sectional view of the cable connector in accordance with the present invention showing the components inside the cable connector.

With reference to FIG. 12, which shows a cable connector in accordance with another preferred embodiment, the difference between the previous embodiment and the embodiment is that a switch terminal 170 of the cable connector of the embodiment is fixed on a first slot 112, and a detective terminal 160 is fixed on a second slot 113. An elastic piece 140 is initially in a deformation state, and an elastic cantilever 147 is connected with a groove 125, which maintains a pressing body 120 abutted at a first position. A flange 123 of the pressing body 120 is abutted against an abutting surface 175 of the switch terminal 170 to push a contact part 177 of the switch terminal 170 toward a contact end 165 of a detective terminal 160, making the contact part 177 of the switch terminal 170 abutted against the contact end 165 of the detective terminal 160 to produce an electrical connection state. The electrical connection state provides a detecting signal with respect to the cable connector with no cable connected. When the cable connector is connected with a cable, a hand lever 121 of the pressing body 120 rotates along a direction 183 to overcome a force that the elastic piece 140 acts on the pressing body 120. The pressing body 120 drives a deformation of the elastic piece 140 to enlarge a receiving gap 185 between the elastic piece 140 and a conductive element 150, allowing the cable to be inserted therein. After the cable is inserted in the receiving gap 185, the elastic piece 140 rebounds and the pressing body 120 is held at a second position. At the second position, the flange 123 of the pressing body 120 is disengaged from the abutting surface 175 of the switch terminal 170 to release a pressure that the pressing body 120 acts on the abutting surface 175 of the switch terminal 170, allowing the elastic arm 173 to rebound along a direction 187. The contact part 177 is thus separate from the contact end 165 and an electrical connection therebetween is cut off. The electrical connection between the switch terminal 170 and the detective terminal 160 is detectable by means of terminal detection and is appeared in the form of a detecting signal related to the cable connector in which the cable is inserted.

According to the embodiment, if the electrical connection state between the switch terminal 170 and the detective terminal 160 is detected as "electrically connected", i.e. the first conductive state, it is concluded that there is no cable connected with the cable connector. If the electrical connection state between the switch terminal 170 and the detective terminal 160 is detected as "electrically disconnected", i.e. the second conductive state, it is concluded that there is a cable connected with the cable connector.

According to the above description with respect to the preferred embodiments of the present invention, the electrical connection state between the cable connector and the cable can be determined through the detection of the electrical connection state between the switch terminal and the detective terminal.

It is understood that the invention may be embodied in other forms within the scope of the claims. Thus the present examples and embodiments are to be considered in all respects as illustrative, and not restrictive, of the invention defined by the claims.

What is claimed is:

1. A cable connector, comprising: a housing;
   an opening formed with the housing to receive a cable; a conductive element fixed on the housing;
   a pressing body connected with the housing, the pressing body being rotated between a first position and a second position;
   an elastic piece fixed on the housing, the elastic piece is abutted against the pressing body at the first position; and
   two terminals fixed on the housing, including a first terminal and a second terminal adjacent to the first terminal;
   when the pressing body is at the first position, a receiving gap between the elastic piece and the conductive element is closed to prevent the cable from entering the receiving gap, and the pressing body is abutted against the first terminal, to define an electrical connection state between the first terminal and the second terminal as a first conductive state;
   when the pressing body is at the second position, the receiving gap between the elastic piece and the conductive element is opened to receive the cable which is then electrically connected with the conductive element, and the pressing body is disengaged with the first terminal, to define an electrical connection state between the first terminal and the second terminal as a second conductive state.

2. The cable connector of claim 1, wherein the pressing body is formed with a flange, and the flange is abutted against the first terminal.

3. The cable connector of claim 1, wherein the conductive element includes a top and a bottom, the top of the conductive element is located in the housing, and the bottom of the conductive element is extended out of the housing.

4. The cable connector of claim 3, wherein a top of the elastic piece is formed with an elastic cantilever, the pressing body is formed with a groove, and the elastic cantilever is inserted in the groove to enable the elastic piece to be abutted against the pressing body.

5. The cable connector of claim 4, wherein the top of the elastic piece is formed with a cutting edge.

6. The cable connector of claim 5, wherein a top of the conductive element is formed with a cantilever, and a receiving gap is formed between the cutting edge of the elastic piece and the cantilever of the conductive element.

7. The cable connector of claim 1, wherein the housing has a pivot, and the pressing body is arranged on the pivot and rotatably connected with the housing.

8. The cable connector of claim 1, wherein the first terminal has a contact part, and an electrical connection is formed when the contact part of the first terminal is connected with the second terminal.

9. The cable connector of claim 1, wherein the housing has a raised column, and the conductive element is arranged on the raised column and fixed on the housing.

10. The cable connector of claim 1, further comprising a cover plate, wherein the cover plate covers a side opening of the housing.

* * * * *